(12) United States Patent
Lu

(10) Patent No.: US 11,187,850 B2
(45) Date of Patent: Nov. 30, 2021

(54) ELECTRONIC DEVICE, DISPLAY ASSEMBLY THEREOF, AND BACKLIGHT MODULE THEREOF

(71) Applicant: GUANGDONG OPPO MOBILE TELECOMMUNICATIONS CORP., LTD., Guangdong (CN)

(72) Inventor: Zhongheng Lu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/915,393

(22) Filed: Jun. 29, 2020

(65) Prior Publication Data

US 2020/0326469 A1 Oct. 15, 2020

Related U.S. Application Data

(63) Continuation of application No. PCT/CN2019/072194, filed on Jan. 17, 2019.

(30) Foreign Application Priority Data

Jan. 31, 2018 (CN) .......................... 201810106074.1

(51) Int. Cl.
*F21V 8/00* (2006.01)

(52) U.S. Cl.
CPC .......... *G02B 6/0088* (2013.01); *G02B 6/0053* (2013.01); *G02B 6/0068* (2013.01); *G02B 6/0091* (2013.01)

(58) Field of Classification Search
CPC .. G02B 6/0088; G02B 6/0053; G02B 6/0068; G02B 6/0091
See application file for complete search history.

(56) References Cited

U.S. PATENT DOCUMENTS

2011/0051412 A1* 3/2011 Jeong ................ G02F 1/133603
362/235
2012/0002441 A1* 1/2012 Yabe ................. G02F 1/133615
362/607

(Continued)

FOREIGN PATENT DOCUMENTS

CN 102597603 A 7/2012
CN 202837741 U 3/2013

(Continued)

OTHER PUBLICATIONS

English Translation of Chinese First Office Action and Written Opinion for related Chinese application No. 201810106074.1, dated Jun. 21, 2019 (9 pages).

(Continued)

*Primary Examiner* — Mary Ellen Bowman
(74) *Attorney, Agent, or Firm* — Young Basile Hanlon & MacFarlane, P.C.

(57) ABSTRACT

A backlight module includes: a light guide plate; a plurality of light sources, arranged on a side edge of the light guide plate and spaced apart from each other along a width direction of the light guide plate; a light homogenizer, arranged on the light guide plate; a flexible circuit board, partially arranged on a region of the light guide plate uncovered by the light homogenizer, and a reservation gap defined between the flexible circuit board and the light homogenizer; a light-shielding layer, arranged in a non-display region of the backlight module and including a plurality of first and second light-shielding portions. The first light-shielding portions are arranged on regions corresponding to the light sources. The second light-shielding portions are arranged on regions corresponding to gaps between every two adjacent light sources. A thickness of the (Continued)

first light-shielding portions is greater than that of the second light-shielding portions.

20 Claims, 4 Drawing Sheets

(56) References Cited

U.S. PATENT DOCUMENTS

| | | | | |
|---|---|---|---|---|
| 2013/0271700 | A1* | 10/2013 | Nakamura | G02B 6/0055 349/65 |
| 2015/0241618 | A1* | 8/2015 | Jung | G02B 6/0031 349/65 |

FOREIGN PATENT DOCUMENTS

| | | | | | |
|---|---|---|---|---|---|
| CN | 103175034 | A | * | 6/2013 | |
| CN | 103175034 | A | | 6/2013 | |
| CN | 103527966 | A | | 1/2014 | |
| CN | 204129371 | U | | 1/2015 | |
| CN | 104536167 | A | * | 4/2015 | G02B 6/0016 |
| CN | 104536167 | A | | 4/2015 | |
| CN | 204403961 | U | | 6/2015 | |
| CN | 204719370 | U | | 10/2015 | |
| CN | 205427394 | U | | 8/2016 | |
| CN | 106842713 | A | * | 6/2017 | |
| CN | 106842713 | A | | 6/2017 | |
| CN | 206638920 | U | | 11/2017 | |
| CN | 108254973 | A | | 7/2018 | |
| JP | 2017198735 | A | | 11/2017 | |
| KR | 20110041825 | A | | 4/2011 | |
| KR | 20110041825 | A | * | 4/2011 | |
| KR | 20130015792 | A | | 2/2013 | |
| WO | 2013011912 | A1 | | 1/2013 | |
| WO | 2019149085 | A1 | | 8/2019 | |

OTHER PUBLICATIONS

English Translation Chinese Second Office Action and Written Opinion for related Chinese application No. 201810106074.1, dated Jun. 8, 2019 (10 pages).

International Search Report and Written Opinion for related International application No. PCT/CN2019/072194, dated Mar. 28, 2019 (2 pages).

European Search Report for EP Application 19748254.0 dated Jan. 25, 2021. (9 pages).

Indian Examination Report for IN Application 202017025035 dated Aug. 9, 2021. (5 pages).

* cited by examiner

ELECTRONIC DEVICE, DISPLAY ASSEMBLY THEREOF, AND BACKLIGHT MODULE THEREOF

CROSS-REFERENCE TO RELATED APPLICATION(S)

The present application is a continuation application of International (PCT) Patent Application No. PCT/CN2019/072194, filed on Jan. 17, 2019, which claims priority to Chinese Patent Application No. 201810106074.1, filed on Jan. 31, 2018, the entire contents of both of which are hereby incorporated by reference in their entireties.

TECHNICAL FIELD

The present disclosure relates to the field of backlight technology of electronic devices, and in particular to an electronic device, a display assembly of an electronic device, and a backlight module of an electronic device.

BACKGROUND

Currently, as technologies evolve, electronic devices, such as a smart mobile phone, have become a necessity of people's daily lives gradually.

A backlight module is a significant component of an electronic device. Currently the backlight module of a portable electronic device, such as a mobile phone, is typically an edge-type backlight module. That is, light emitted from a light source enters a light guide plate from a side edge of the light guide plate, such that backlight may be provided to a display panel through the light guide plate. However, the light source of the edge-type backlight module and some structures related to such the light source may be required to be arranged at the side edge of the light guide plate, and therefore, a relatively large portion of a non-display region may be occupied, and an electronic device having a narrow edge and a full screen may not be easily achieved. Manufacturers have focused on how to reduce a width of the backlight module in the non-display region without impacting the backlight module and enabling the display panel to display normally.

SUMMARY

According to a first aspect of the present disclosure, a backlight module is provided and includes: a light guide plate; a plurality of light sources; a light homogenizer; a flexible circuit board; and a light-shielding layer. The plurality of light sources are arranged on a side edge of the light guide plate and spaced apart from each other along a width direction of the light guide plate, and a plurality of gaps are defined between every two adjacent light sources. The light homogenizer is arranged on the light guide plate, covering a region of a top surface of the light guide plate. The flexible circuit board is partially arranged on a region of the top surface of the light guide plate uncovered by the light homogenizer, and a reservation gap is defined between the flexible circuit board and the light homogenizer. The light-shielding layer is arranged in a non-display region of the backlight module and configured to shield light emitted by the plurality of light sources and escaping from the reservation gap. The light-shielding layer includes a plurality of first light-shielding portions and a plurality of second light-shielding portions, the plurality of first light-shielding portions are arranged to correspond to the plurality of light sources, the plurality of second light-shielding portions are arranged to correspond to the plurality of gaps, and a thickness of the plurality of first light-shielding portions is greater than a thickness of the plurality of second light-shielding portions.

According to a second aspect of the present disclosure, a display assembly is provided and includes a display panel and a backlight module providing backlight for the display panel. The backlight module includes: a light guide plate; a plurality of light sources; a light homogenizer; a flexible circuit board; and a light-shielding layer. The plurality of light sources are arranged on a side edge of the light guide plate and spaced apart from each other along a width direction of the light guide plate, and a plurality of gaps are defined between every two adjacent light sources. The light homogenizer is arranged on the light guide plate, covering a region of a top surface of the light guide plate. The flexible circuit board is partially arranged on a region of the top surface of the light guide plate uncovered by the light homogenizer, and a reservation gap is defined between the flexible circuit board and the light homogenizer. The light-shielding layer is arranged in a non-display region of the backlight module and configured to shield light emitted by the plurality of light sources and escaping from the reservation gap. The light-shielding layer includes a plurality of first light-shielding portions and a plurality of second light-shielding portions, the plurality of first light-shielding portions are arranged to correspond to the plurality of light sources, the plurality of second light-shielding portions are arranged to correspond to the plurality of gaps, and a thickness of the plurality of first light-shielding portions is greater than a thickness of the plurality of second light-shielding portions. The thickness of the plurality of first light-shielding portions is gradually decreased along a direction away from the plurality of light sources.

According to a third aspect of the present disclosure, an electronic device is provided and includes a back shell, a middle frame, and a display assembly. The middle frame is fixedly connected to the back shell. The display assembly is fixed with the middle frame. The display assembly includes a display panel and a backlight module providing backlight for the display panel. The backlight module includes: a light guide plate; a plurality of light sources; a light homogenizer; a flexible circuit board; and a light-shielding layer. The plurality of light sources are arranged on a side edge of the light guide plate and spaced apart from each other along a width direction of the light guide plate, and a plurality of gaps are defined between every two adjacent light sources. The light homogenizer is arranged on the light guide plate, covering a region of a top surface of the light guide plate. The flexible circuit board is partially arranged on a region of the top surface of the light guide plate uncovered by the light homogenizer, and a reservation gap is defined between the flexible circuit board and the light homogenizer. The light-shielding layer is arranged in a non-display region of the backlight module and configured to shield light emitted by the plurality of light sources and escaping from the reservation gap. The light-shielding layer includes a plurality of first light-shielding portions and a plurality of second light-shielding portions, the plurality of first light-shielding portions are arranged to correspond to the plurality of light sources, the plurality of second light-shielding portions are arranged to correspond to gaps between every two adjacent light sources, a thickness of the plurality of first light-shielding portions is greater than a thickness of the plurality of second light-shielding portions, and the thickness of the plurality of second light-shielding portions is uniform.

BRIEF DESCRIPTION OF DRAWINGS

To further illustrate technical solutions of embodiments of the present disclosure in details, drawings needed for describing the embodiments will be briefly introduced. Obviously, following drawings are only some embodiments of the present disclosure. Any one of skill in the art may obtain other drawings based on the following drawings without contributing creative work.

DETAILED DESCRIPTION

Figure 1:
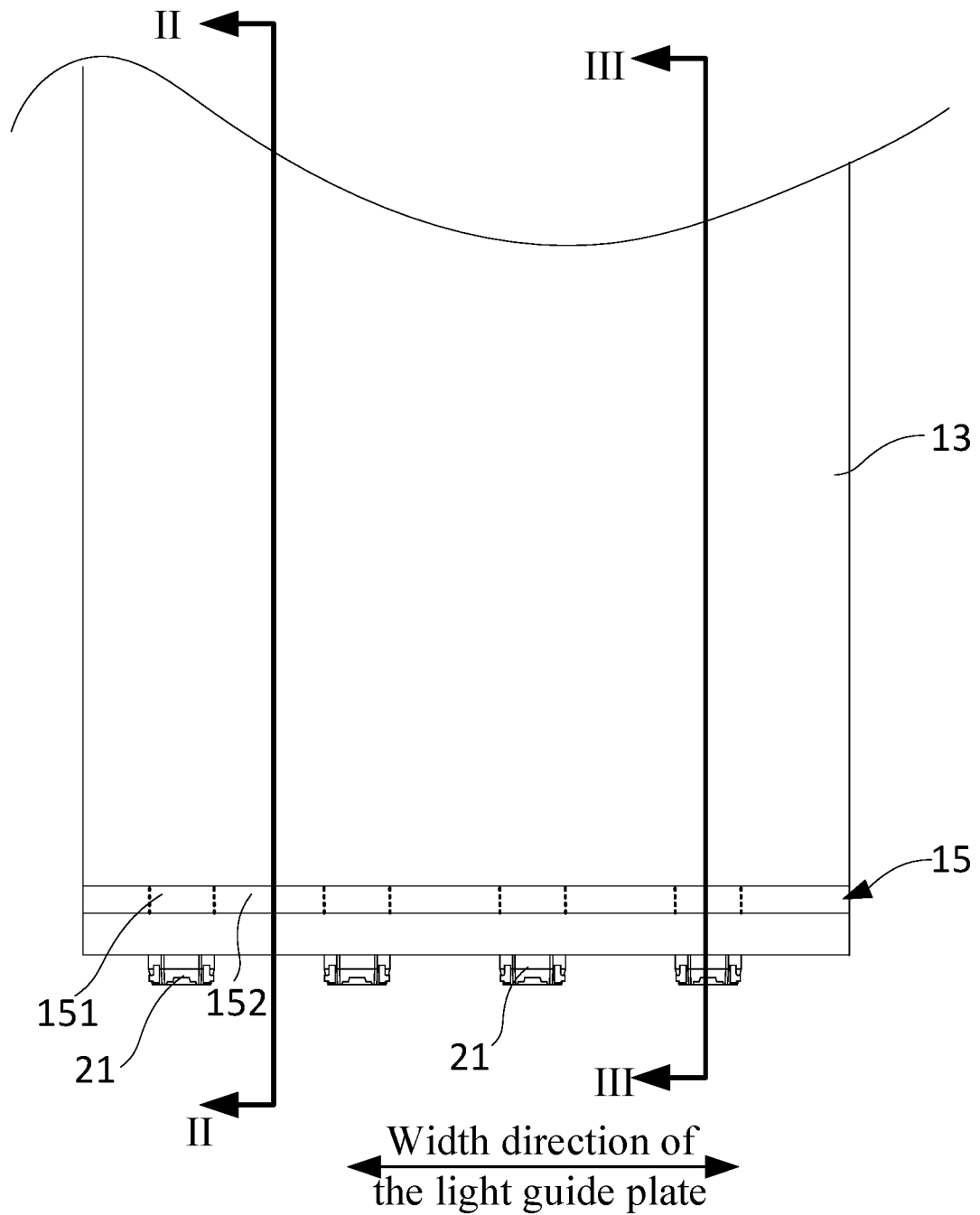
FIG. 1 is a top view of a backlight module with a back frame and glue frames unshown, exhibiting a positional relation among the light guide plate, a light-shielding layer, and a light source according to an embodiment of the present disclosure.

Technical solutions in embodiments of the present disclosure may be illustrated clearly and comprehensively by referring to the drawings of the embodiments. It may be understood that, the illustrated embodiments are for the purpose of explaining the present disclosure, but not to limit the present disclosure. Further, to provide a concise description, a part of, but not all of, the structures related to the present disclosure may be shown. Based on the embodiments of the present disclosure, all other embodiments obtained by any one of skill in the art without creative work should be within the scope of the present disclosure.

Terms of "first", "second", and the like are used to distinguish various objects, but not to describe a particular sequence. In addition, terms of "include", "have", and other forms thereof indicates a non-exclusive inclusion. For example, a process, a method, a system, a product, or a device including a series of operations or units is not limited to include the listed operations or units only, unlisted operations or units or other operations or units inherently included therein may alternatively be included The term "embodiment" indicates that specific characteristics, structures, or properties described in an embodiment may be included in at least one embodiment of the present disclosure. The expression "embodiment" appearing in various sections of the present specification may not indicate a same embodiment, and may not indicate an independent or alternative embodiment mutually exclusive of other embodiments. Any one of skill in the art should implicitly and explicitly understand that the embodiments described herein can be combined with other embodiments.

According to a first aspect of the present disclosure, a backlight module is provided and includes: a light guide plate; a plurality of light sources; a light homogenizer; a flexible circuit board; and a light-shielding layer. The plurality of light sources are arranged on a side edge of the light guide plate and spaced apart from each other along a width direction of the light guide plate, and a plurality of gaps are defined between every two adjacent light sources. The light homogenizer is arranged on the light guide plate, covering a region of a top surface of the light guide plate. The flexible circuit board is partially arranged on a region of the top surface of the light guide plate uncovered by the light homogenizer, and a reservation gap is defined between the flexible circuit board and the light homogenizer. The light-shielding layer is arranged in a non-display region of the backlight module and configured to shield light emitted by the plurality of light sources and escaping from the reservation gap. The light-shielding layer includes a plurality of first light-shielding portions and a plurality of second light-shielding portions, the plurality of first light-shielding portions are arranged to correspond to the plurality of light sources, the plurality of second light-shielding portions are arranged to correspond to the plurality of gaps, and a thickness of the plurality of first light-shielding portions is greater than a thickness of the plurality of second light-shielding portions.

In some embodiments, the light guide plate includes a light-incidence portion and a body portion, the plurality of light sources are arranged on a side of the light-incidence portion opposing to the body portion, and the light homogenizer is arranged on the body portion.

In some embodiments, a portion of the light-shielding layer is received in the reservation gap, and another portion of the light-shielding layer is arranged between the light homogenizer and the light guide plate.

In some embodiments, the light homogenizer includes a diffusion film, a first brightness enhancement film, and a second brightness enhancement film, sequentially arranged along a direction away from the light guide plate, a portion of the light-shielding layer is received in the reservation gap, and another portion of the light-shielding layer is arranged between the diffusion film and the first brightness enhancement film or between the first brightness enhancement film and the second brightness enhancement film.

In some embodiments, the thickness of the plurality of first light-shielding portions gradually decreases along a direction away from the plurality of light sources.

In some embodiments, the thickness of the plurality of second light-shielding portions is uniform, and a thickness of a thinnest portion of each first light-shielding portion is greater than the thickness of the plurality of second light-shielding portions.

In some embodiments, the backlight module further includes a light-shielding tape, arranged on a face of the flexible circuit board away from the plurality of light sources, and the light-shielding tape is connected to the light homogenizer.

In some embodiments, the backlight module further includes a connection tape. A portion of the flexible circuit board is connected to the region of the top surface of the light guide plate uncovered by the light homogenizer via the connection tape, and the thickness of the plurality of first light-shielding portions is less than a thickness of the connection tape.

In some embodiments, the backlight module further includes back frame and a glue frame. The back frame includes a bottom wall and at least one side wall connected to the bottom wall. The glue frame is arranged on the bottom wall and arranged to abut against the side wall. The glue frame is further arranged on a bottom side of the flexible circuit board and a side of the plurality of light sources away from the light guide plate. A space is defined between the glue frame and the plurality of light sources for light mixing and heat dissipation.

According to a second aspect of the present disclosure, a display assembly is provided and includes a display panel and a backlight module providing backlight for the display panel. The backlight module includes: a light guide plate; a plurality of light sources; a light homogenizer; a flexible circuit board; and a light-shielding layer. The plurality of light sources are arranged on a side edge of the light guide plate and spaced apart from each other along a width direction of the light guide plate, and a plurality of gaps are defined between every two adjacent light sources. The light homogenizer is arranged on the light guide plate, covering a region of a top surface of the light guide plate. The flexible circuit board is partially arranged on a region of the top surface of the light guide plate uncovered by the light homogenizer, and a reservation gap is defined between the flexible circuit board and the light homogenizer. The light-shielding layer is arranged in a non-display region of the backlight module and configured to shield light emitted by the plurality of light sources and escaping from the reservation gap. The light-shielding layer includes a plurality of first light-shielding portions and a plurality of second light-shielding portions, the plurality of first light-shielding portions are arranged to correspond to the plurality of light sources, the plurality of second light-shielding portions are arranged to correspond to the plurality of gaps, and a thickness of the plurality of first light-shielding portions is greater than a thickness of the plurality of second light-shielding portions. The thickness of the plurality of first light-shielding portions is gradually decreased along a direction away from the plurality of light sources.

In some embodiments, the light guide plate includes a light-incidence portion and a body portion, the plurality of light sources are arranged on a side of the light-incidence portion opposing to the body portion, and the light homogenizer is arranged on the body portion.

In some embodiments, a portion of the light-shielding layer is received in the reservation gap, and another portion of the light-shielding layer is arranged between the light homogenizer and the light guide plate.

In some embodiments, the light homogenizer includes a diffusion film, a first brightness enhancement film, and a second brightness enhancement film, sequentially arranged along a direction away from the light guide plate, a portion of the light-shielding layer is received in the reservation gap, and another portion of the light-shielding layer is arranged between the diffusion film and the first brightness enhancement film or between the first brightness enhancement film and the second brightness enhancement film.

In some embodiments, the thickness of the plurality of second light-shielding portions is uniform, and a thickness of a thinnest portion of each first light-shielding portion is greater than the thickness of the plurality of second light-shielding portions.

In some embodiments, the backlight module further includes a light-shielding tape, arranged on a face of the flexible circuit board away from the plurality of light sources, and the light-shielding tape is connected to the light homogenizer.

In some embodiments, the backlight module further includes a connection tape. A portion of the flexible circuit board is connected to the region of the top surface of the light guide plate uncovered by the light homogenizer via the connection tape, and the thickness of the plurality of first light-shielding portions is less than a thickness of the connection tape.

In some embodiments, the backlight module further includes a back frame and a glue frame. The back frame includes a bottom wall and at least one side wall connected to the bottom wall. The glue frame is arranged on the bottom wall and arranged to abut against the side wall. The glue frame is further arranged on a bottom side of the flexible circuit board and a side of the plurality of light sources away from the light guide plate. A space is defined between the glue frame and the plurality of light sources for light mixing and heat dissipation.

According a third aspect of the present disclosure, an electronic device is provided and includes a back shell, a middle frame, and a display assembly. The middle frame is fixedly connected to the back shell. The display assembly is fixed with the middle frame. The display assembly includes a display panel and a backlight module providing backlight for the display panel. The backlight module includes: a light guide plate; a plurality of light sources; a light homogenizer; a flexible circuit board; and a light-shielding layer. The plurality of light sources are arranged on a side edge of the light guide plate and spaced apart from each other along a width direction of the light guide plate, and a plurality of gaps are defined between every two adjacent light sources. The light homogenizer is arranged on the light guide plate, covering a region of a top surface of the light guide plate. The flexible circuit board is partially arranged on a region of the top surface of the light guide plate uncovered by the light homogenizer, and a reservation gap is defined between the flexible circuit board and the light homogenizer. The light-shielding layer is arranged in a non-display region of the backlight module and configured to shield light emitted by the plurality of light sources and escaping from the reservation gap. The light-shielding layer includes a plurality of first light-shielding portions and a plurality of second light-shielding portions, the plurality of first light-shielding portions are arranged to correspond to the plurality of light sources, the plurality of second light-shielding portions are arranged to correspond to gaps between every two adjacent light sources, a thickness of the plurality of first light-shielding portions is greater than a thickness of the plurality of second light-shielding portions, and the thickness of the plurality of second light-shielding portions is uniform.

In some embodiments, the thickness of the plurality of first light-shielding portions is gradually decreased along a direction away from the plurality of light sources, and a thickness of a thinnest portion of each first light-shielding portion is greater than the thickness of the plurality of second light-shielding portions.

In some embodiments, electronic device further includes a cover, arranged to cover the display assembly.

Figure 2:
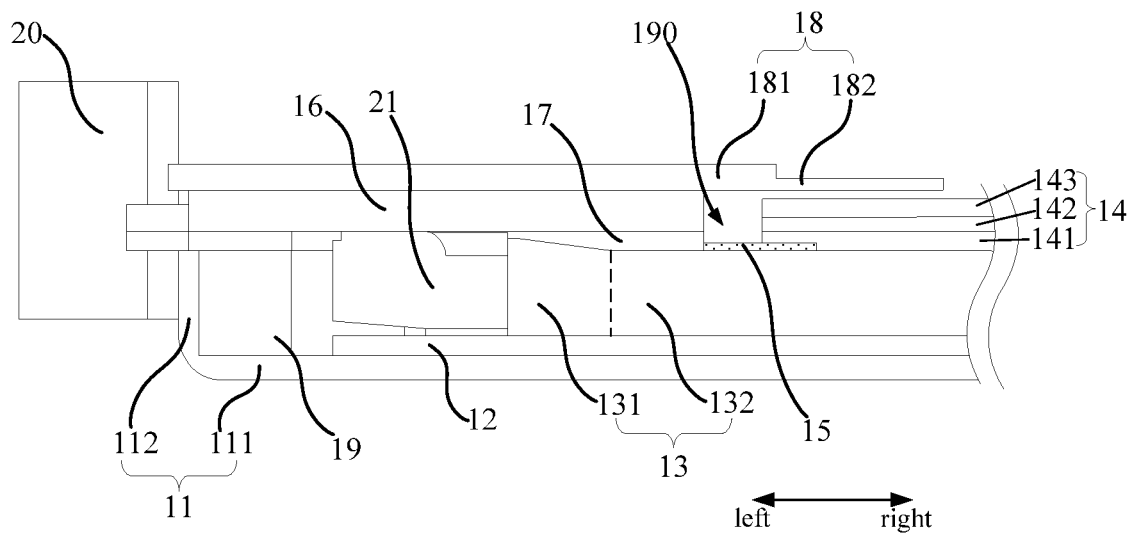
FIG. 2 is a cross-sectional view of the backlight module according to the embodiment shown in FIG. 1, taken along a line II-II.
Figure 3:
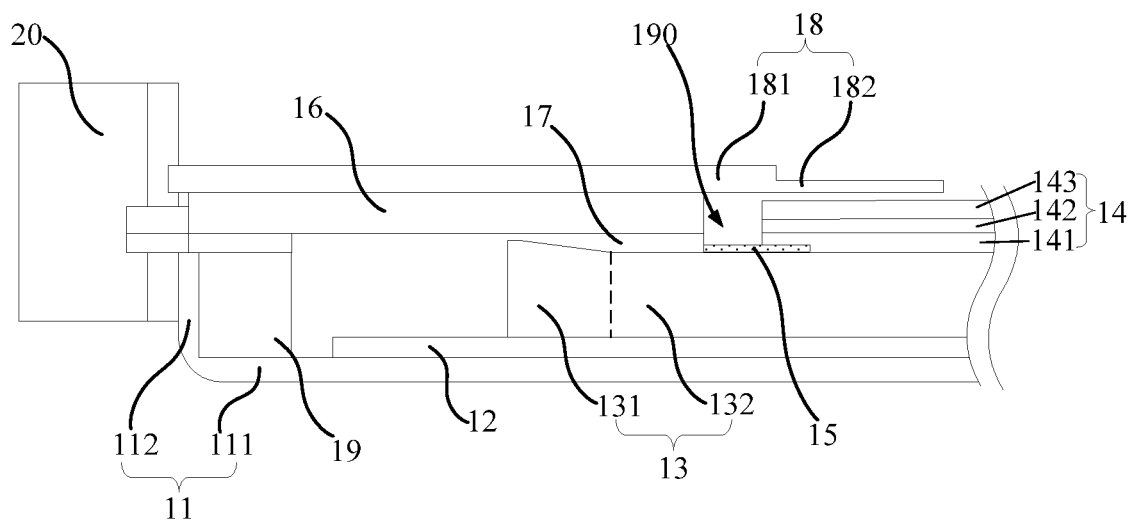
FIG. 3 is a cross-sectional view of the backlight module according to the embodiment shown in FIG. 1, taken along a line III-III.

As shown in FIGS. 1 to 3, FIG. 1 is a top view of a backlight module with a back frame and glue frames unshown, exhibiting a positional relation among the light guide plate, a light-shielding layer, and a light source according to an embodiment of the present disclosure; FIG. 2 is a cross-sectional view of the backlight module according to the embodiment shown in FIG. 1, taken along a line II-II; and FIG. 3 is a cross-sectional view of the backlight module according to the embodiment shown in FIG. 1, taken along a line III-III.

In the present embodiment, the backlight module may include a back frame 11, a reflection sheet 12, a light guide plate 13, a light homogenizer 14, a light-shielding layer 15, a flexible circuit board 16, a connection tape 17, a light-shielding tape 18, a first glue frame 19, a second glue frame 20, and a plurality of light sources 21.

The back frame 11 has a boxed structure and defines an opening on a side of the back frame 11. The back frame 11 may include a bottom wall 111 and a side wall 112. The bottom wall 111 and the side wall 112 are bent to connect to each other. Specifically, the bottom wall 111 may be connected to the side wall 112. The bottom wall 111 and the side wall 112 may be flat. The bottom wall 111 may substantially perpendicular to the side wall 112. The bottom wall 111 and the side wall 112 define a receiving chamber. The back frame 11 may be made of metal, such as iron, aluminum, and the like.

The reflection sheet 12 may be arranged on the bottom wall 111 of the back frame 11 and received in the receiving chamber.

The light guide plate 13 may be arranged on the reflection sheet 12, covering a region of a top surface of the reflection sheet 12, and received in the receiving chamber.

The light guide plate 13 may include a light-incidence portion 131 and a body portion 132. The light-incidence portion 131 may have a light-incidence side, and a thickness of the light-incidence side of the light-incidence portion 131 may be greater than a thickness of the body portion 132.

Alternatively, a thickness of the light-incidence portion 131 may be gradually decreased from the light-incidence side to a side away from the light-incidence side. The thickness of the body portion 132 of the light guide plate may be uniform, and that is each region of the body portion 132 may have a same thickness.

The plurality of light sources 21 may be arranged on a region of the top surface of the reflection sheet 12 uncovered by the light guide plate 13 and on a side edge of the light guide plate 13. The plurality of light sources 21 may be arranged on the light-incidence side of the light guide plate 13. The plurality of light sources 21 may be a plurality of light-emitting diode (LED) lamps. The plurality of light sources 21 may be arranged on a side of the light-incidence portion 131 opposing to the body portion 132 of the light guide plate. For example, as shown in FIG. 2, the plurality of light sources 21 may be arranged on a left side of the light guide plate 13.

As shown in FIG. 1, the light guide plate may be rectangular from the top view, and the plurality of light sources 21 may be spaced apart from each other along a width direction of the light guide plate 13.

The light homogenizer 14 may be arranged on the body portion 132 of the light guide plate, covering a portion of the light guide plate 13. The light homogenizer 14 may include a diffusion film 141, a first brightness enhancement film 142, and a second brightness enhancement film 142, sequentially arranged along a direction away from the light guide plate 13. Alternatively, the diffusion film 141, the first brightness enhancement film 142, and the second brightness enhancement film 143 may be independent from each other. Alternatively, at least two of the diffusion film 141, the first brightness enhancement film 142, and the second brightness enhancement film 143 may be arranged as one integrated structure.

The first glue frame 19 may be arranged on the bottom wall 111 of the back frame 11 and may abut against the side wall 112. The first glue frame 19 may be arranged on a side of each light source 21 away from the light guide plate 13. For example, the first glue frame 19 may be arranged on a left side of the plurality of light sources 21 as shown in FIG. 2, and a space may be defined between the first glue frame 19 and the plurality of light sources 21 for light mixing and heat dissipation.

The flexible circuit board 16 may partially be arranged on a portion of the light guide plate 13 uncovered by the light homogenizer 14, and a portion of the flexible circuit board 16 that is not arranged on the light guide plate 13 may be arranged above the first glue frame 19 and the plurality of light sources 21.

The plurality of light sources 21 may be fixed on a bottom surface of the portion of the flexible circuit board 16 that is not arranged on the light guide plate 13. The plurality of light sources 21 may be electrically connected to the flexible circuit board 16. A line on the flexible circuit board 16 may connect to the plurality of light sources 21 and an external power supply pin, such that the external power supply pin may provide power for the plurality of light sources 21.

The flexible circuit board 16 may be adhered to the portion of the light guide plate 13 uncovered by the light homogenizer 14 via the connection tape 17. The connection tape 17 may be a double-sided tape. A side of the double-sided tape may be adhered to the bottom surface of the flexible circuit board 16, and the other side of the double-sided tape may be adhered to a top surface of the light guide plate 13 correspondingly.

A reservation gap 190 may be defined between an end of the flexible circuit board 16 and the connection tape 17 close to the light homogenizer 14 and an end of the light homogenizer 14 close to the flexible circuit board 16. The reservation gap 190 may be defined to allow an assembling error and allow the backlight module to work normally when deformation caused by high and low temperatures occurs.

The light-shielding tape 18 may be arranged on the flexible circuit board 16 and a portion of the light homogenizer 14. The light-shielding tape 18 may be adhered to a top surface of the light homogenizer 14, such that the light homogenizer 14 may be fixed.

Alternatively, the light-shielding tape 18 may include a first sub-light-shielding portion 181 and a second sub-light-shielding portion 182. The first sub-light-shielding tape 181 may be arranged to cover the flexible circuit board 16, and the second sub-light-shielding portion 182 may be arranged to cover a portion of the light homogenizer 14. A thickness of the first sub-light-shielding portion 181 may be greater than that of the second sub-light-shielding portion 182.

The second glue frame 20 may be arranged on a side of the light-shielding tape 18 and the flexible circuit board 16 away from the light homogenizer 14 (such as a left side shown in FIG. 2) to fix the light-shielding tape 18 and the flexible circuit board 16.

The first glue frame 19 may be received in the receiving chamber of the back frame 11, and the second glue frame 20 may be arranged out of the receiving chamber of the back frame 11.

The light-shielding layer 15 may be arranged in a non-display region of the backlight module and may be configured to shield the light emitted by the plurality of light sources 21 and escaping from the reservation gap 190, such that the light emitted by the plurality of light sources 21 and escaping from the reservation gap 190 may be shielded by the light-shielding layer 15. The non-display region may refer to a region covered by the light-shielding tape 18, and a display region may refer to a region uncovered by the light-shielding tape 18.

In some embodiments, the light shielding layer 15 may be arranged on a portion of the top surface of the light guide plate 13 and arranged between the light homogenizer 14 and the flexible circuit board 16. The portion of the top surface of the light guide plate 13 may be uncovered by the light homogenizer 14 and the flexible circuit board 16 and exposed to the reservation gap 190.

Alternatively, in the present embodiment, the light shielding layer 15 may further be arranged to extend to reach a position between the light homogenizer 14 and the light guide plate 13. An end region of the light homogenizer 14 close to the plurality of light sources 21 may be covered by the light shielding layer 15. That is, the light-shielding layer 15 may be extended to cover a surface of the light homogenizer 14 close to the light guide plate 13 (i.e., a bottom surface of the diffusion film 141 of the light homogenizer 14).

It may be understood that, the light-shielding layer 15 may be arranged at any position within the non-display region, with the proviso of the light emitted by the plurality of light sources 31 able to be blocked from escaping from the reservation gap 190.

For example, the light-shielding layer 15 received in the reservation gap 190 covering the portion of the top surface of the light guide plate 13 may be extended to reach a position between the diffusion film 141 and the first brightness enhancement film 142. Specifically, the light-shielding layer 15 may be extended to cover a portion of a surface of the diffusion film 141 (a top surface) facing the first brightness enhancement film 142 and a portion of a surface of the brightness enhancement film 142 facing the diffusion film 141. The portion of the surface of the diffusion film 141 covered by the light-shielding layer 15 and the portion of the surface of the brightness enhancement film 142 covered by the light-shielding layer 15 may be within the non-display region.

The light-shielding layer 15 may be made of light-shielding material. For example, the light-shielding layer 15 may be a layer of black ink.

Alternatively, the light shielding layer 15 may be formed by performing a printing process or a coating process. The printing process may be a screen printing process.

As shown in FIG. 1, the light-shielding layer 15 may include a plurality of first light-shielding portions 151 and a plurality of second light-shielding portions 152. The plurality of first light-shielding portions 151 may be arranged on regions corresponding to the plurality of light sources 21. The plurality of second light-shielding portions 152 may be arranged on regions corresponding to a plurality of gaps, and each gap is defined between two adjacent light sources 21.

A number of the printing or the coating process performed to form the plurality of first light-shielding portions 151 may be greater than that performed to form the plurality of second light-shielding portions 152, such that a thickness of the plurality of first light-shielding portions 151 may be greater than that of the second light-shielding portions 152. For example, taking the light-shielding layer 15 formed between the light guide plate 13 and the light homogenizer 14 and on the surface of the light guide plate 13 as an example, the plurality of first light-shielding portions 151 may be formed on the surface of the light guide plate 13 by performing the printing processes twice. The plurality of second light-shielding portions 152 may be formed on the surface of the light guide plate 13 by perform the printing process once. A different number of times performing the printing process may be applied herein, and is not limited by the present disclosure.

Alternatively, the thickness of the plurality of first light-shielding portions 151 may be less than that of the connection tape 17.

The thickness of the light-shielding layer 15 on the regions corresponding to the plurality of light sources 21 (i.e., the first light-shielding portions 151) may be greater than that of the light-shielding layer 15 on regions corresponding to the gaps between every two adjacent light sources 21 (i.e., the second light-shielding portions 152). As a region in which the plurality of light sources 21 is located may have higher brightness, and a gap between two adjacent light sources may have lower brightness, such arrangement of the light-shielding layer 15 may prevent unequal brightness of the region in which a light source 21 is located and the gap between two adjacent light sources.

As shown in FIG. 2 and FIG. 3, FIG. 2 is a cross-sectional view of the region corresponding to the light source, and therefore, the light-shielding layer 15 shown in FIG. 2 may be a first light-shielding portion 151. FIG. 3 is a cross-sectional view of the region corresponding to the gap between two adjacent light sources, and therefore, the light-shielding layer 15 shown in FIG. 3 may be a second light-shielding portion 152.

In another implementation, the light-shielding layer 15 may be formed by performing a photolithographic process or an etching process.

A degree of the photolithographic process or the etching process to form the plurality of first light-shielding portions 151 may be less than that to form the plurality of second light-shielding portions 152, such that the thickness of the plurality of first light-shielding portions 151 may be greater than that of the second light-shielding portions 152.

For example, in one situation, taking the light-shielding layer 15 formed between the light guide plate 13 and the light homogenizer 14 and on the top surface of the light guide plate 13 as an example, a light-shielding substrate having a uniform thickness may be formed on the top surface of the light guide plate 13 firstly. Subsequently, a mask may be disposed on the light-shielding substrate to shield regions of the light-shielding substrate corresponding to the plurality of light sources 21, and regions of the light-shielding substrate corresponding to the gaps between every two adjacent light sources 21 may be exposed through a plurality of openings of the mask. The photolithographic process may be performed on the exposed regions of the light-shielding substrate, such that the second light-shielding portions 152 having a relatively small thickness may be formed in the exposed regions, and the first light-shielding portions 151 having a relatively large thickness may be formed in the regions covered by the mask. Under such situation, the degree of the photolithographic process to form the first light-shielding portions 151 may be zero, and the degree of the photolithographic process to form the second light-shielding portions 152 may be greater than zero.

In another situation, taking the light-shielding layer 15 formed between the light guide plate 13 and the light homogenizer 14 and on the top surface of the light guide plate 13 as an example, a light-shielding substrate having a uniform thickness may be formed on the top surface of the light guide plate 13. A semi-transparent mask may be disposed on the light-shielding substrate. The semi-transparent mask may include a plurality of first regions and a plurality of second regions. A transparency of the first regions may be less than that of the second regions. The first regions may be arranged above regions of the light-shielding substrate corresponding to the plurality of light sources 13, and the second regions may be arranged above regions of the light-shielding substrate corresponding to gaps between every two adjacent light sources. Light with a same parameter may irradiate the semi-transparent mask, such that the plurality of first light-shielding portions 151 having a relatively large thickness may be formed in regions of the light-shielding substrate covered by the plurality of first regions, and the plurality of second light-shielding portions 152 having a relatively small thickness may be formed in regions of the light-shielding substrate covered by the plurality of second regions. Under such situation, intensity of light for photolithographing to form the plurality of first light-shielding portions 151 may be less than that to form the plurality of second light-shielding portions 152, and various degrees of the photolithographic process may be achieved.

In other embodiments, the various degrees of the photolithographic process may be achieved by applying various durations of the photolithographic process. For example, a duration of the photolithographic process to form the plurality of first light-shielding portions 151 may be less than a duration of the photolithographic process to form the plurality of second light-shielding portions 152, such that the various degrees of the photolithographic process may be achieved.

Similarly, the plurality of first light-shielding portions 151 and the plurality of second light-shielding portions 152 may be formed by performing the etching process. A degree of the etching process to form the plurality of first light-shielding portions 151 may be less than that to form the plurality of second light-shielding portions 152. Specifically, various degrees of the etching process may be achieved by applying various values of etching parameters, such as various durations of the etching process, various concentrations of an etching solution, and the like. For example, the duration of the etching process performed to form the first light-shielding portions 151 may be less than that to form the second light-shielding portions 152, and/or the concentration of the etching solution to form the first light-shielding portions 151 may be less than that to form the second light-shielding portions 152, such that the thickness of the first light-shielding portions 151 may be greater than that of the second light-shielding portions 152.

In other embodiments, forming the first light-shielding portions 151 thicker than the second light-shielding portions 152 may be achieved by other means, which will not be limited by the present disclosure.

Figure 4:
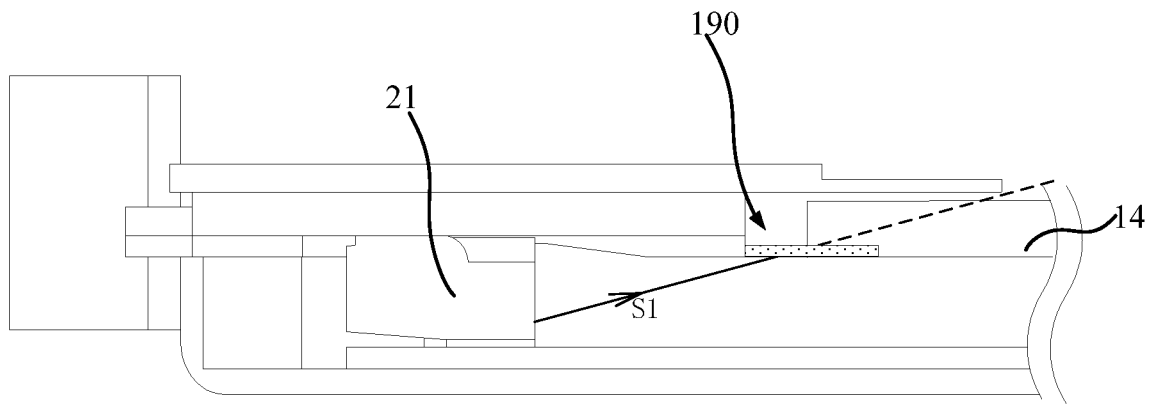
FIG. 4 is a schematic view of the backlight module in a position shown in FIG. 2, showing a principle of a light-shielding layer shielding light.
Figure 5:
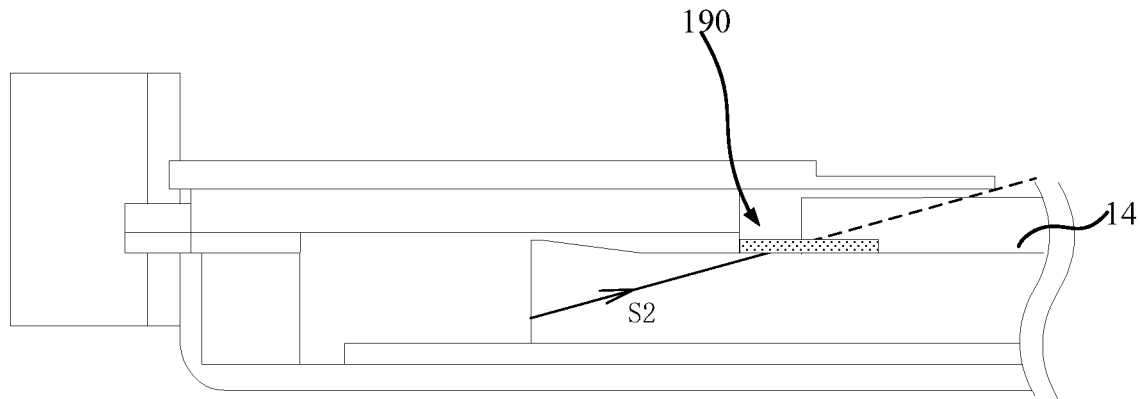
FIG. 5 is a schematic view of the backlight module in a position shown in FIG. 3, showing a principle of a light-shielding layer shielding light.

As shown in FIG. 4 and FIG. 5, FIG. 4 is a schematic view of the backlight module in a position shown in FIG. 2, showing a principle of a light-shielding layer shielding light, and FIG. 5 is a schematic view of the backlight module in a position shown in FIG. 3, showing a principle of a light-shielding layer shielding light.

As shown in FIG. 4, light S1 may be supposed to be emitted by light source 21, passing through and escaping from the reservation gap 190. The light S1 may be shielded by the light-shielding layer 15 (specifically, the first light-shielding portion 151), such that the light may not irradiate to an outside of the backlight module, and may not irradiate to a user's eyes directly. The light-shielding layer 15 may not occupy an independent space along a width direction. Therefore, the width of the non-display region of the backlight module may be reduced, and light escaping may be reduced.

Similarly, as shown in FIG. 5, light S2 may be emitted by a light source 21 adjacent to the gap between two adjacent light sources 21, i.e., emitted by at least one of the two adjacent light sources 21 defining the gap. Intensity of the light S2 may be less than that of the light S1. The light S2 may be supposed to escape from the reservation gap 190 to irradiate to an outside of the backlight module. The arrangement of the light-shielding layer 15 (specifically, the second light-shielding portion 152) may shield the light S2, such that the light S2 may not irradiate to the outside of the backlight module and may not irradiate to the user's eyes.

Further, intensity of the light S1 irradiated from a region corresponding to the light source 21 may be greater than that of the light S2 irradiated from a region corresponding to the gap between two adjacent light sources 21, and the thickness of the first light-shielding portion 151 may be arranged to be greater than that of the second light-shielding portion 152, such that a light-shielding effect of the light-shielding layer 15 on the region corresponding to the light source 21 may be greater than that on the region corresponding to the gap between two adjacent light sources 21, such that uneven brightness across the side edge of the light guide plate 13 may be reduced.

Figure 6:
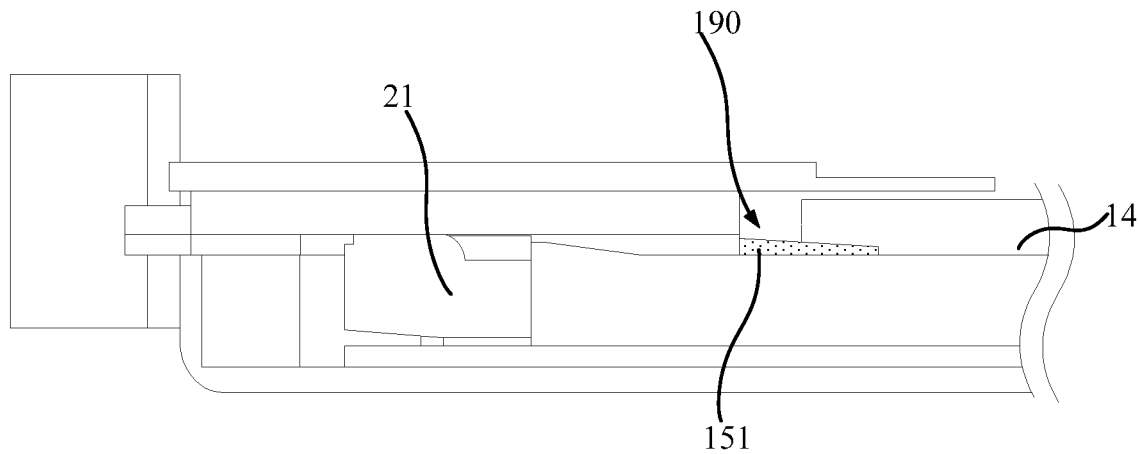
FIG. 6 is a structural schematic view of a backlight module according to another embodiment of the present disclosure.

As shown in FIG. 6, a structural schematic view of a backlight module according to another embodiment of the present disclosure is provided. Being different from the above-mentioned embodiments, the thickness of the first light-shielding portion 151 may be gradually decreased along a direction away from the light source 21. As the closer to the light source 21, the higher intensity of the light, such the arrangement may prevent the light guide plate 13 from having uneven light intensities along a length direction of the light guide plate 13.

Under such situation, the thickness of the first light-shielding portion 151 being greater than that of the second light-shielding portion 152 may specifically refer to a thickness of a thinnest portion of the first light-shielding portion 151 being greater than the thickness of the second light-shielding portion 152.

Figure 7:
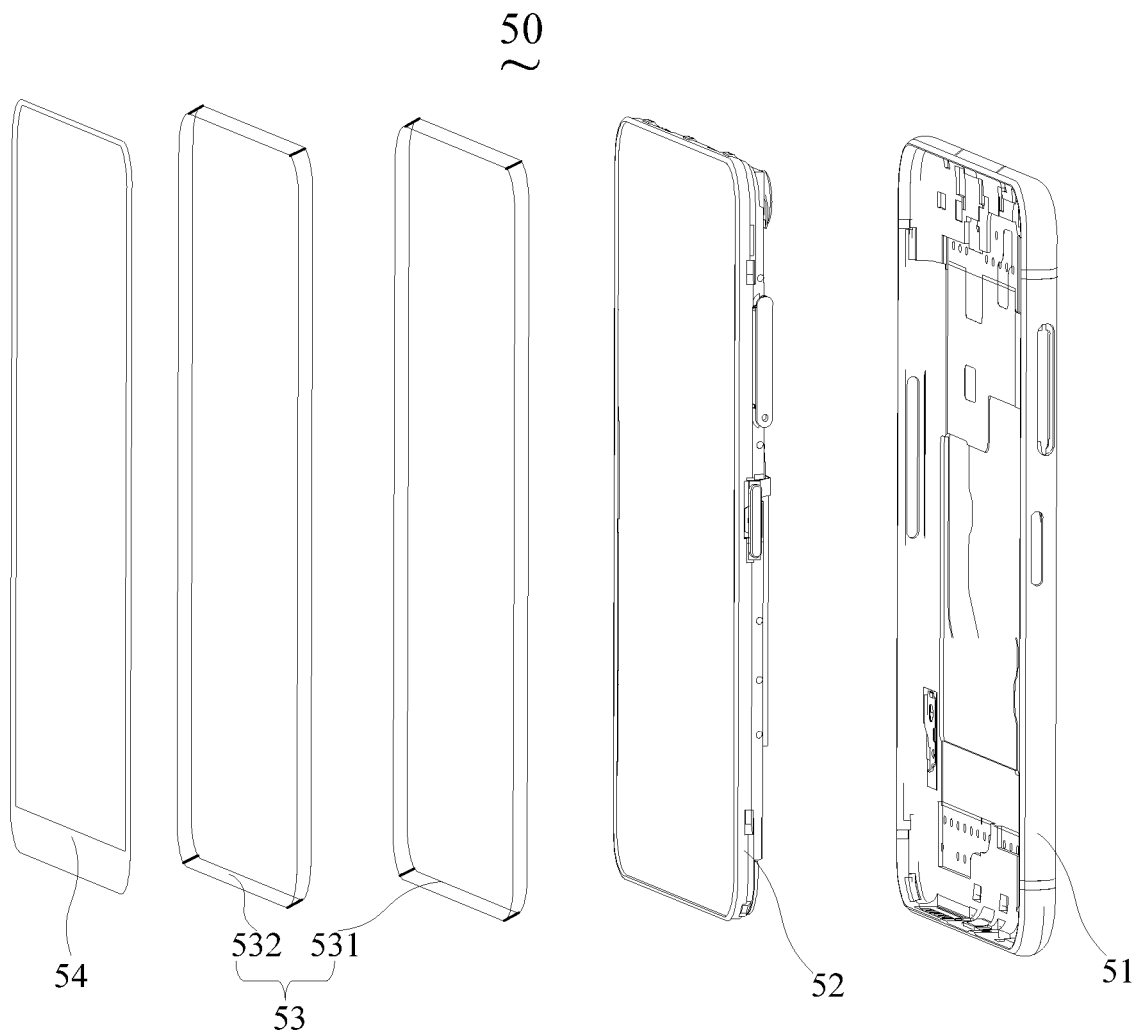
FIG. 7 is a perspective view of an electronic device according to an embodiment of the present disclosure.

As shown in FIG. 7, a perspective view of an electronic device according to an embodiment of the present disclosure is provided. In the present embodiment, the electronic device 50 may be a smart mobile phone. In other embodiments, the electronic device may be a tablet computer, a hand-held computer, an intelligent watch, and the like.

In the present embodiment, the electronic device 50 may include a back shell 51, a middle frame 52, a display assembly 53, and a cover 54.

The middle frame 52 may be fixedly connected to the back shell 51.

The display assembly 53 may be fixed with the middle frame 52.

The display assembly 53 may include a backlight module 531 and a display panel 532. The backlight module 531 may be configured to provide backlight for the display panel 532.

The display panel 532 may be a liquid crystal display panel or a display panel in another type.

The cover 54 may be arranged to cover the display assembly 53. The cover 54 may be a transparent glass cover. On the non-display region, the cover 54 may be non-transparent. For example, the cover 54 may be coated by light-shielding ink for the non-display region.

It may be understood that, other components of the electronic device 50, such as a circuit board and the like, may be arranged between the back shell 51 and the middle frame 52. Such the components are not involved in the present disclosure, and therefore, they are not described in details herein.

In other embodiments, the electronic device 50 may have other structures. The above description about the structures of the electronic device 50 may not limit the scope of the present disclosure.

According to the present embodiment, a backlight module is provided and includes: a light guide plate, a plurality of light sources, a light homogenizer, a flexible circuit board, and a light-shielding layer. The plurality of light sources may be arranged on a side edge of the light guide plate and may be spaced apart from each other along a width direction of the light guide plate. The light homogenizer may be arranged on the light guide plate, covering a part of a top surface of the light guide plate. The flexible circuit board may partially be arranged on a region of the top surface of the light homogenizer uncovered by the light homogenizer, and a reservation gap may be defined between the flexible circuit board and the light homogenizer. The light-shielding layer may be arranged in a non-display region of the backlight module and may be arranged to shield light emitted by the light sources and escaping from the reservation gap. The light-shielding layer may include a plurality of first light-shielding portions and a plurality of second light-shielding portions. The first light-shielding portions may be arranged on regions corresponding to the light sources, and the second light-shielding portions may be arranged on regions corresponding to gaps defined between every two adjacent light sources. A thickness of the first light-shielding portions is greater than that of the second light-shielding portions. In such a way, a width of the non-display region of the backlight module may be reduced, and at the same time, the light may not escape out of the backlight module. Further, as the thickness of regions of the light-shielding layer corresponding to the light sources may be greater than that of regions corresponding to the gaps between light sources, uneven brightness may be prevented.

The above description shows implementations of the present disclosure only, but shall not limit the scope of the present disclosure. Any equivalent structural or process transformation performed based on the drawings and specification of the present disclosure, applied directly or indirectly in other related arts, should be within the scope of the present disclosure.

What is claimed is:

1. A backlight module, comprising:
   a light guide plate;
   a plurality of light sources, arranged on a side edge of the light guide plate and spaced apart from each other along a width direction of the light guide plate, wherein a plurality of gaps are defined between every two adjacent light sources;
   a light homogenizer, arranged on the light guide plate, covering a region of a top surface of the light guide plate;
   a flexible circuit board, partially arranged on a region of the top surface of the light guide plate uncovered by the light homogenizer, wherein a reservation gap is defined between the flexible circuit board and the light homogenizer; and
   a light-shielding layer, arranged in a non-display region of the backlight module and configured to shield light emitted by the plurality of light sources and escaping from the reservation gap, wherein the light-shielding layer comprises a plurality of first light-shielding portions and a plurality of second light-shielding portions, the plurality of first light-shielding portions are arranged to correspond to the plurality of light sources, the plurality of second light-shielding portions are arranged to correspond to the plurality of gaps, and a thickness of the plurality of first light-shielding portions is greater than a thickness of the plurality of second light-shielding portions.

2. The backlight module as claimed in claim 1, wherein the light guide plate comprises a light-incidence portion and a body portion, the plurality of light sources are arranged on a side of the light-incidence portion opposing to the body portion, and the light homogenizer is arranged on the body portion.

3. The backlight module as claimed in claim 1, wherein a portion of the light-shielding layer is received in the reservation gap, and another portion of the light-shielding layer is arranged between the light homogenizer and the light guide plate.

4. The backlight module as claimed in claim 1, wherein the light homogenizer comprises a diffusion film, a first brightness enhancement film, and a second brightness enhancement film, sequentially arranged along a direction away from the light guide plate, a portion of the light-shielding layer is received in the reservation gap, and another portion of the light-shielding layer is arranged between the diffusion film and the first brightness enhancement film or between the first brightness enhancement film and the second brightness enhancement film.

5. The backlight module as claimed in claim 1, wherein the thickness of the plurality of first light-shielding portions gradually decreases along a direction away from the plurality of light sources.

6. The backlight module as claimed in claim 5, wherein the thickness of the plurality of second light-shielding portions is uniform, and a thickness of a thinnest portion of each first light-shielding portion is greater than the thickness of the plurality of second light-shielding portions.

7. The backlight module as claimed in claim 1, further comprising a light-shielding tape, arranged on a face of the flexible circuit board away from the plurality of light sources, wherein the light-shielding tape is connected to the light homogenizer.

8. The backlight module as claimed in claim 1, further comprising a connection tape, wherein a portion of the flexible circuit board is connected to the region of the top surface of the light guide plate uncovered by the light homogenizer via the connection tape, and the thickness of the plurality of first light-shielding portions is less than a thickness of the connection tape.

9. The backlight module as claimed in claim 1, further comprising a back frame and a glue frame, wherein the back frame comprises a bottom wall and at least one side wall connected to the bottom wall;
   the glue frame is arranged on the bottom wall and arranged to abut against the side wall;
   the glue frame is further arranged on a bottom side of the flexible circuit board and a side of the plurality of light sources away from the light guide plate; and
   a space is defined between the glue frame and the plurality of light sources for light mixing and heat dissipation.

10. A display assembly, comprising a display panel and a backlight module providing backlight for the display panel, and the backlight module comprising:
    a light guide plate;
    a plurality of light sources, arranged on a side edge of the light guide plate and spaced apart from each other along a width direction of the light guide plate, wherein a plurality of gaps are defined between every two adjacent light sources;
    a light homogenizer, arranged on the light guide plate, covering a region of a top surface of the light guide plate;
    a flexible circuit board, partially arranged on a region of the top surface of the light guide plate uncovered by the light homogenizer, wherein a reservation gap is defined between the flexible circuit board and the light homogenizer; and a light-shielding layer, arranged in a non-display region of the backlight module and configured to shield light emitted by the plurality of light sources and escaping from the reservation gap, wherein the light-shielding layer comprises a plurality of first light-shielding portions and a plurality of second light-shielding portions, the plurality of first light-shielding portions are arranged to correspond to the plurality of light sources, the plurality of second light-shielding portions are arranged to correspond to the plurality of gaps, a thickness of the plurality of first light-shielding portions is greater than a thickness of the plurality of second light-shielding portions, and the thickness of the plurality of first light-shielding portions is gradually decreased along a direction away from the plurality of light sources.

11. The display assembly as claimed in claim 10, wherein the light guide plate comprises a light-incidence portion and a body portion, the plurality of light sources are arranged on a side of the light-incidence portion opposing to the body portion, and the light homogenizer is arranged on the body portion.

12. The display assembly as claimed in claim 10, wherein a portion of the light-shielding layer is received in the reservation gap, and another portion of the light-shielding layer is arranged between the light homogenizer and the light guide plate.

13. The display assembly as claimed in claim 10, wherein the light homogenizer comprises a diffusion film, a first brightness enhancement film, and a second brightness enhancement film, sequentially arranged along a direction away from the light guide plate, a portion of the light-shielding layer is received in the reservation gap, and another portion of the light-shielding layer is arranged between the diffusion film and the first brightness enhancement film or between the first brightness enhancement film and the second brightness enhancement film.

14. The display assembly as claimed in claim 10, wherein the thickness of the plurality of second light-shielding portions is uniform, and a thickness of a thinnest portion of each first light-shielding portion is greater than the thickness of the plurality of second light-shielding portions.

15. The display assembly as claimed in claim 10, wherein the backlight module further comprises a light-shielding tape, arranged on a face of the flexible circuit board away from the plurality of light sources, and the light-shielding tape is connected to the light homogenizer.

16. The display assembly as claimed in claim 10, wherein the backlight module further comprises a connection tape, a portion of the flexible circuit board is connected to the region of the top surface of the light guide plate uncovered by the light homogenizer via the connection tape, and the thickness of the plurality of first light-shielding portions is less than a thickness of the connection tape.

17. The display assembly as claimed in claim 10, wherein the backlight module further comprising a back frame and a glue frame, wherein the back frame comprises a bottom wall and at least one side wall connected to the bottom wall;

the glue frame is arranged on the bottom wall and arranged to abut against the side wall;

the glue frame is further arranged on a bottom side of the flexible circuit board and a side of the plurality of light sources away from the light guide plate; and a space is defined between the glue frame and the plurality of light sources for light mixing and heat dissipation.

18. An electronic device, comprising a back shell, a middle frame, and a display assembly, the middle frame being fixedly connected to the back shell, the display assembly being fixed with the middle frame, the display assembly comprising a display panel and a backlight module providing backlight for the display panel, and the backlight module comprising:

a light guide plate;

a plurality of light sources, arranged on a side edge of the light guide plate and spaced apart from each other along a width direction of the light guide plate, wherein a plurality of gaps are defined between every two adjacent light sources;

a light homogenizer, arranged on the light guide plate, covering a region of a top surface of the light guide plate;

a flexible circuit board, partially arranged on a region of the top surface of the light guide plate uncovered by the light homogenizer, wherein a reservation gap is defined between the flexible circuit board and the light homogenizer; and a light-shielding layer, arranged in a non-display region of the backlight module and configured to shield light emitted by the plurality of light sources and escaping from the reservation gap, wherein the light-shielding layer comprises a plurality of first light-shielding portions and a plurality of second light-shielding portions, the plurality of first light-shielding portions are arranged to correspond to the plurality of light sources, the plurality of second light-shielding portions are arranged to correspond to the plurality of gaps, a thickness of the plurality of first light-shielding portions is greater than a thickness of the plurality of second light-shielding portions, and the thickness of the plurality of second light-shielding portions is uniform.

19. The electronic device as claimed in claim 18, wherein the thickness of the plurality of first light-shielding portions is gradually decreased along a direction away from the plurality of light sources, and a thickness of a thinnest portion of each first light-shielding portion is greater than the thickness of the plurality of second light-shielding portions.

20. The electronic device as claimed in claim 18, further comprising a cover, arranged to cover the display assembly.

* * * * *